J. J. WILKINS,

Assignor, by mesne assignments, to EBERHARD MANUFACTURING CO.

HARNESS HOOK.

No. 10,043. Reissued Feb. 21, 1882.

Witnesses;
Jacob Felbel.
R. H. Sampson.

Inventor;
J. J. Wilkins
By atty.
J. N. McIntire

N. PETERS, Photo-Lithographer, Washington, D. C.

UNITED STATES PATENT OFFICE.

J. J. WILKINS, OF VIRDEN, ILLINOIS, ASSIGNOR, BY MESNE ASSIGNMENTS, TO EBERHARD MANUFACTURING COMPANY, OF CLEVELAND, OHIO.

HARNESS-HOOK.

SPECIFICATION forming part of Reissued Letters Patent No. 10,043, dated February 21, 1882.

Original No. 55,942, dated June 26, 1866. Application for reissue filed September 24, 1881.

*To all whom it may concern:*

Be it known that I, J. J. WILKINS, of Virden, in the county of Macoupin and State of Illinois, have invented certain new and useful Improvements in Pad-Hooks for Harness; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use the invention, I will proceed to describe it.

My invention consists in constructing the body of the hook with a hole for a strap to pass through, and also with ears projecting on either side for securing it by means of rivets to the strap.

My invention further consists in constructing the body of the hook with a hole or mortise running transversely thereto and adapted to the passage through it of a strap, as and for purposes to be hereinafter explained.

My invention further consists in constructing the body of the hook with transversely-arranged horizontal ears or lugs projecting from either side thereof, for the purpose of securing the hook by means of rivets to the strap, as will be hereinafter further explained.

Figure 1:
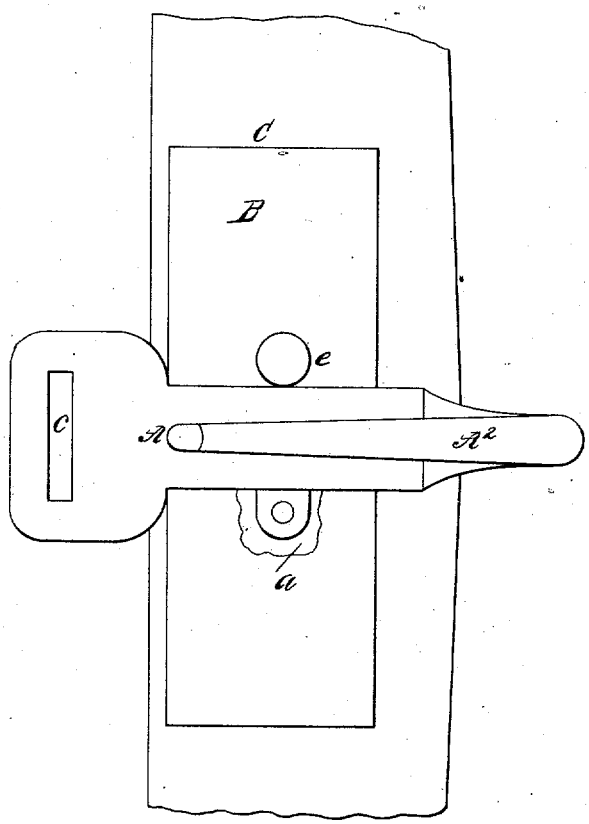
Figure 2:
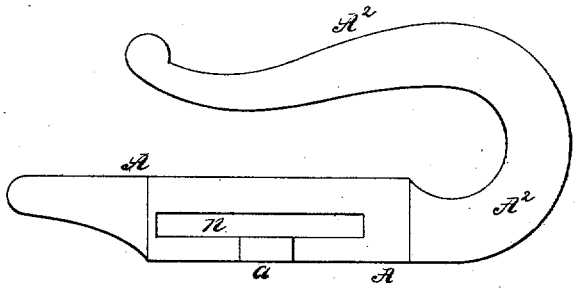

In the accompanying drawings, Figure 1 is a top plan view of my improved hook, illustrating the manner in which it is attached to the pad or back-strap of a harness; and Fig. 2 is a side view of the hook alone.

A represents the body portion, and $A^2$ the upper curved portion, of my improved pad-hook. The upper or hook portion proper, $A^2$, is constructed in about the usual manner, but through the lower or body portion, A, is made a hole or mortise, *n*, as best seen at Fig. 2, and the said body portion A is provided with transverse projections forming ears or lugs, *a*, the lower surfaces of which are preferably in the same plane as the base of the hook. The shape and location of the ears or lug-like devices *a* will be clearly understood from the drawings, in which one is seen in edge view at Fig. 2 and in top or plan view at Fig. 1, (a portion of the covering-strap being broken away at the last-named figure to better show the ear.) Each of the ears or lugs *a* has a hole for the accommodation of a rivet, *e*, by means of which it may be secured to the strap to which it is desired it may be fastened.

B is a strap, which is inserted in or passed through the hole *n*, and rivets being then inserted in the holes of the ears *a* and through the strap B, the latter and the body of the hook may be thus riveted together. The strap or piece B, with the hook thus attached, may be then secured to the pad or back-strap C of the harness by the usual terrets, or in any other suitable manner.

By this manner of constructing and securing the hook it can be attached to a pad or to a simple flat back-strap without having any screw or other portion projecting through the pad or back-strap, thus preventing the possibility of chafing or otherwise injuring the animal's back; and the retention of the hook in place will be more effectual than where the latter has no transversely-arranged horizontal projections for its securement at two points in the manner shown. At the same time my improved harness-hook is exceedingly simple, economic of manufacture, and desirable.

Having thus fully described my invention, what I claim is—

1. A pad-hook provided with the transverse opening or hole *n*, and also with the horizontally-projecting ears *a*, the whole constructed and operating as and for the purposes set forth.

2. A pad-hook provided with the transverse opening or hole *n*, substantially as and for the purpose described.

3. A pad-hook the base of which is provided with horizontal transverse ears *a* projecting from opposite points of the sides of the base, substantially in the manner and for the purpose specified.

In testimony whereof I have hereunto set my hand this 30th day of August, 1881.

J. J. WILKINS.

In presence of—
C. M. WALWORTH,
F. D. HEATON.